United States Patent [19]
Baird et al.

[11] Patent Number: 5,834,560
[45] Date of Patent: Nov. 10, 1998

[54] LIQUID CRYSTALLINE POLYMER-REINFORCED THERMOPLASTIC FIBERS

[75] Inventors: Donald G. Baird; Christopher G. Robertson, both of Blacksburg, Va.; Jose P. de Souza, Woodbury, Minn.

[73] Assignee: Virginia Tech Intellectual Properties Inc., Blacksburg, Va.

[21] Appl. No.: 639,615

[22] Filed: Apr. 29, 1996

[51] Int. Cl.[6] ............................. C08L 23/12; C08L 67/02; C08L 77/00; C08L 81/04
[52] U.S. Cl. ........................ 525/132; 525/425; 525/434; 525/437; 525/444; 525/537; 428/372
[58] Field of Search ..................... 525/132, 425, 525/434, 437, 444, 537; 428/372

[56] References Cited

U.S. PATENT DOCUMENTS

| | | | |
|---|---|---|---|
| 4,792,587 | 12/1988 | Kanoe | 525/132 |
| 5,006,402 | 4/1991 | Isayer | 525/132 |
| 5,043,400 | 8/1991 | Tsuruta | 525/437 |
| 5,225,488 | 7/1993 | Biard | 525/132 |

*Primary Examiner*—Patricia A. Short
*Attorney, Agent, or Firm*—Thelen Reid & Priest LLP

[57] ABSTRACT

The present invention is directed to in situ reinforced thermoplastic fibers having improved mechanical properties and a method of making same. These composites have improved tensile strength and tensile moduli that exceed that predicted by composite theory under the rule of mixtures. The in situ composites can be used in woven preforms.

37 Claims, 2 Drawing Sheets

LIQUID CRYSTALLINE POLYMER-REINFORCED THERMOPLASTIC FIBERS

This invention was made with U.S. Government support under grant DAAH04-94-G-0282 awarded by the Army Research Office. The government has certain rights in the invention.

BACKGROUND OF THE INVENTION

1. Field of the Invention

The present invention relates to reinforced thermoplastics in which a continuous fibrillar morphology is formed in situ within a matrix. More specifically, the invention relates to in situ fibrillar liquid crystal polymer reinforced thermoplastic materials having enhanced mechanical properties and a method of making same.

2. Related Art

In situ composites of thermoplastics reinforced with thermotropic liquid crystalline polymer (TLCP) fibrils have been produced using a wide variety of materials and processing methods. Conventional in situ composites can exhibit a range of mechanical properties in accordance with a composite theory "rule of mixtures," discussed in detail below. The properties of in situ composites, such as tensile modulus and strength, are dependent on the properties of the TLCP fibrils incorporated therein and the processing technique used to form the composites.

The predominant prior art method for producing in situ composites is injection molding. The composites can be preblended in an extruder prior to producing the in situ composite, and the extrusion system can be fitted with a static mixer to achieve additional mixing (A. A. Handlos et al., "Processing and Associated Properties of In Situ Composites Based on Thermotropic Liquid Crystalline Polymers and Thermoplastics," *Rev. Macromol. Chem. Phys.*, C35(2), 183, 186 (1995)) (hereinafter "A. A. Handlos et al."). However, injection molding produces an undesirable skin-core morphology with fibrous TLCP present in the skin region and TLCP droplets in the core region. Id. at 194. This skin orientation is caused by elongational flow near the mold surface in an advancing front that generates TLCP fibrils during mold filling. After the fiber is formed, it is frozen along the mold wall, and the core is less oriented because it is only subjected to shear flow. Id. This morphology is undesirable, because the TLCP droplets in the core do not contribute to mechanical property enhancement of the matrix material, and therefore yield less than optimal reinforcement.

A single extrusion method utilizing a single screw extruder has also been used to form in situ compositions. Typically, mixing or blending is done either in a single screw extruder or a single screw extruder in series with a static mixer or a twin screw extruder or in an injection molding unit. Extrusion blending generally yields strands and fibers having improved tensile properties over injection-molded parts of the same TLCP composition. Id. at 191. The mixing apparati provide a good dispersion of the TLCP in the matrix; however, the dispersion created by the single or twin screw extruder is in the form of TLCP droplets. This requires further extensional deformation to convert the TLCP droplets into elongated structures that in turn can form more continuous fibrillar structures if the concentration of the dispersed phase is high enough to allow the individual elongated structures to coalesce and attain more continuity. In addition, blends formed by extrusion out of a single or twin screw extruder often have the undesirable skin-core type of structure discussed above.

Applicant's dual extrusion mixing method is disclosed in U.S. Pat. No. 5,225,488 to Baird et al., the entire contents of which are hereby incorporated herein by reference. According to this method, two single-screw extruders are used to extrude the TLCP and the matrix phase separately. The two extruders are connected to a static mixer where the two component streams are blended. The method does not rely on droplet deformation and breakup to form TLCP fibrils. This allows processing of thermoplastic/TLCP pairs with non-overlapping processing temperature ranges and production of strands containing continuous TLCP fibrils at any TLCP composition. Therefore, no skin-core morphology develops in the extruded strands. A. A. Handlos et al. at 201. In addition, the blends can be more easily drawn than those produced by blending in a single extruder, because the blends have higher melt strength due to lower processing temperatures.

The mechanical properties of in situ composites directly correlate to the degree of molecular orientation within the TLCP phase (Robertson et al., "Composites Based on Fabric Prepregs Generated From In Situ Reinforced Thermoplastic Fibers," *ANTEC '95*, 1649 (1995)) (hereinafter "Robertson et al."). Flow strength affects the deformation and orientation of the TLCP phase, and therefore also affects the mechanical properties of in situ composites. Thus, properties that can be achieved in an in situ composite depend upon the particular processing method employed. Typically, mechanical properties of in situ composites processed by fiber spinning methods, where elongation flow prevails, are higher than those obtained from processes such as injection molding that involve shear flow.

For example, drawn strands and fibers have improved tensile properties over injection-molded parts having the same TLCP composition. PET (polyethylene terephthalate) and VECTRA A (commercially known as VECTRA A900/950, a copolyester of 27 mole % 2-hydroxy-6-napthoic acid (HNA) and 73 mole % hydroxybenzoic acid (HBA) that is available from the Celanese Corporation) strands (PET/30 weight percent VECTRA A) produced by the dual-extruder method disclosed in U.S. Pat. No. 5,225,488 exhibit greater draw ratio and Young's modulus values than those for PET VECTRA A strands produced by a single-extruder method. A. A. Handlos et al. at 200–201 (1995). Table 1 (reproduced from A. A. Handlos et al. at 201) shows the results of a mixing study comparing the properties of strands produced by the dual-extruder mixing system and those produced in a single screw extruder. The dual extruder method produces fibers having moduli up to 50% higher than the moduli of fibers produced from a single screw extruder.

TABLE 1

Comparison of Properties of Strands produced by Dual-Extruder Versus Single-Screw Extruder Mixing Systems (PET 30 Weight Percent VECTRA A)

| Dual Extruder | | Single-Screw Extruder | |
| --- | --- | --- | --- |
| Draw Ratio | Young's Modulus (GPa) | Draw Ratio | Young's Modulus (GPa) |
| 2.36 | 5.45 (0.58) | 4.55 | 3.98 (0.23) |
| 3.25 | 6.97 (0.34) | 7.10 | 7.08 (0.82) |
| 39.0 | 13.31 (0.37) | 13.0 | 8.05 (0.09) |
| 43.2 | 17.21 (0.13) | 20.0 | 8.49 (0.54) |
| 49.7 | 18.99 (0.17) | 49 | 13.39 (0.45) |

Reported values are an average of at least four tests, and standard deviations are given in parentheses.

The machine-direction draw (or drawdown) ratio $D_R$ is defined as follows:

$$D_r = \frac{V}{v_0};$$

where V is the takeup speed, and $v_0$ is the die extrusion speed. See Donald G. Baird and Dimitris I. Collias, *Polymer Processing Principles and Design*, Butterworth-Heinemann, page 266 (Boston 1995). U.S. Pat. No. 5,225,488 discloses a method for blending polymeric materials at draw ratios between 5.0 and 67.0 for blends of PET and VECTRA A at composition ratios of 96/4, 90/10 and 70/30 (FIG. 3); at draw ratios between 4.55 and 49 for PET/VECTRA A (70/30) blends (FIG. 4); and at draw ratios between 3.11 and 40.85 for polypropylene, PP/VECTRA B (88/21), PP/VECTRA B (74/26) and PP/VECTRA A (72/28) (FIG. 9). The inventive method discussed in detail below allows drawing at higher draw ratios to yield fibers having increased mechanical properties.

According to composite theory, the Tsai-Halpin equation is used to relate the modulus of a composite to the moduli of the matrix and reinforcing phase and the aspect ratio of the reinforcing fiber. A. A. Handlos et al. at 201–203. The Tsai-Halpin equation allows one to predict the modulus of an in situ composite formed from a particular thermoplastic and a particular TLCP. The equations for a unidirectional composite system are:

$$E_c = E_m \left( \frac{1 + \xi \eta V_f}{1 - \eta V_f} \right) \quad (1)$$

$$\eta = \frac{E_f/E_m - 1}{E_f/E_m + \zeta} \quad (2)$$

$$\zeta = 2(L/D) \quad (3)$$

where $E_c$ is the composite modulus, $E_m$ is the modulus of the matrix material, $E_f$ is the modulus of the reinforcing fiber, $V_f$ is the volume fraction of the reinforcing fibers, and L/D is the fiber aspect ratio. When the aspect ratio of the reinforcing fiber reaches 100, the Tsai-Halpin equation reduces to the rule of mixtures, as follows:

$$E_c = V_f E_f + V_m E_m$$

where $V_m$ is the volume fraction of the matrix material. When the rule of mixtures is used to predict the modulus of composite materials, it is assumed that the composite is reinforced with fibers of a uniform aspect ratio of 100. Thus, the Tsai-Halpin equation and the rule of mixtures provide a theoretical limit for in situ composition modulus. Although there is no adequate theory for dealing with strength, the rule of mixtures may be used as an upper limit for estimating the strength, especially for uniaxially reinforced composite systems, by replacing E in equation (3) with the strength.

"As-spun" (i.e., before any post-drawing or annealing) TLCP fibers have moduli ranging from 50 to 100 GPa, examples of which are listed in Table 2 (reproduced from A. A. Handlos et al. at 205).

TABLE 2

Moduli of Some As-Spun TLCP Fibers

| Fiber | Composition | Modulus (GPa) |
|---|---|---|
| VECTRAN A | 73/27 HBA/HNA | 65 |
| VECTRAN B | Copolyesteramide | 75 |
| 60% HBA/PET | HBA/PET | 50 |

TABLE 2-continued

Moduli of Some As-Spun TLCP Fibers

| Fiber | Composition | Modulus (GPa) |
|---|---|---|
| B-7 | HBA/BBA/TA/IA | 100 |
| B-6-2 | HBA/BBA/TA/IA | 90 |

HBA = p-hydroxybenzoic acid;
HNA = 2-hydroxy-6-napthoic acid;
PET = polyethylene terephthalate;
BBA = p,p-biphenol bis-acetate;
TA = terephthalic acid;
IA = isophthalic acid Table 3 (reproduced from A. A. Handlos et al. at 210) lists conventional modulus values found in the literature compared to predicted modulus values calculated using the rule of mixtures. The modulus of the in situ composite compares well to the modulus predicted by the rule of mixtures for spun fibers; however, the values for injection-molded samples are considerably lower than expected if the spun fiber modulus is used for $E_f$.

TABLE 3

Comparison of Modulus for In Situ Composites Found in Literature Against Values Predicted by Composite Theory

| | Modulus | | | |
|---|---|---|---|---|
| | Actual | Predicted[a] GPa | | |
| In situ composite | GPA | Similar | Fiber | Test part |
| PP/30% VECTRA A | 2.16 | 4.24 | 15.8 | TB |
| PP/30% VECTRA A[b] | 2.70 | 4.24 | 15.8 | TB |
| PP/30% VECTRA A | 2.94 | 3.54 | 15.8 | PQ |
| PP/30% VECTRA B | 3.67 | 7.55 | 18.0 | TB |
| PP/30% VECTRA B[b] | 5.28 | 7.55 | 18.0 | TB |
| PET/30% VECTRA A | 5.50 | 4.12 | 21.3 | PQ |
| PET/20% VECTRA A | 3.42 | 3.68 | 15.0 | PQ |
| PEI/30% VECTRA A | 5.81 | 5.38 | 21.5 | TB |
| PEI/30% HX1000 | 8.7 | 5.58 | — | TB |
| PEI/30% HX4000 | 9.8 | 9.36 | — | TB |
| PET/30% VECTRA A | 19.0 | 21.5 | 21.6 | S (50) |
| PET/20% VECTRA A | 11.1 | 11.65 | 15.0 | S (80) |
| PP/28% VECTRA B | 4.7 | 18.7 | 18.7 | S (35) |
| PP/26% VECTRA A | 13.5 | 20.0 | 20.0 | S (40) |
| PEI/30% K161 | 7 | 10.5 | — | F (30) |
| (PPE/PS)/20% VECTRA B | 16.5 | 17 | — | F (45) |
| PC/30% VECTRA A | 9.9 | 10.6 | 20.6 | F (4.5) |
| PC/30% Granlar | 5.9 | 11.1 | — | F (12) |
| PEI/30% Granlar | 10.1 | 11.6 | — | F (2) |

Draw ratios are in parentheses.
TB = tensile bars;
PQ = plaques;
S = extruded strands;
F = Spun fibers.
[a]Similar indicates that the predicted modulus was calculated using the value of $E_f$ for the TLCP processed by the same method as the composite. Fiber indicates $E_f$ is equal to the as-spun fiber modulus.
[b]Compatibilized with 10 wt % maleic anhydride PP.

As discussed above, conventional in situ compositions have maximum moduli according to the theoretical limit predicted by the Tsai-Halpin equation and the rule of mixtures. However, the present invention provides in situ compositions with improved mechanical properties, including moduli exceeding those predicted by the rule of mixtures.

SUMMARY OF THE INVENTION

The present invention provides in situ reinforced thermoplastic compositions having improved mechanical properties and a method of making same. According to the method, thermoplastic fibers reinforced with liquid crystalline polymers are produced according to a dual extrusion method at relatively high draw ratios. The resulting compositions have tensile strengths higher than that expected based on the rule of mixtures. In addition, the moduli of the compositions exceed theoretical moduli predicted by the rule of mixtures. Accordingly, the compositions are produced at higher draw ratios than those achieved by conventional methods and exhibit moduli and strengths that are conventionally believed to be unattainable.

The increased moduli indicate that the compositions are capable of providing greater reinforcement than other known compositions. When the compositions are spun into improved in situ composite fibers and incorporated into products such as woven preforms, their full reinforcement potential is transferred to the product. Thus, the improved fibers yield a stronger, more highly reinforced product than composite in situ fibers produced by more conventional methods. This is particularly desirable in the automobile industry, where in situ reinforced polypropylene fibers could be incorporated into preforms to create automobile parts. Therefore, preforms incorporating the inventive fibers could be woven into preforms to create products, such as automobile parts, having improved strength and reinforcement characteristics.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
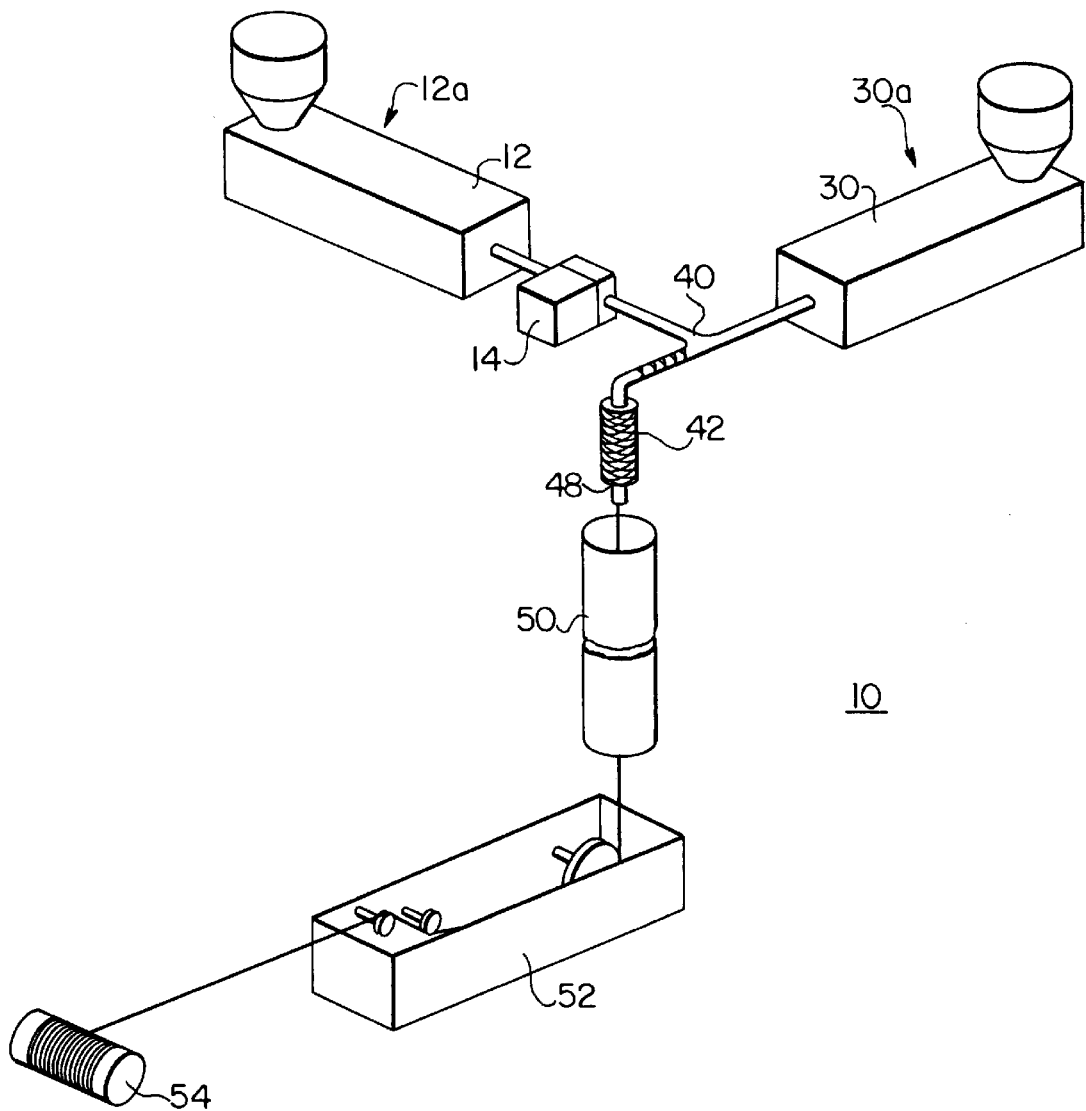
FIG. 1 illustrates the dual extrusion apparatus employed to yield the inventive in situ compositions.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

According to the present invention, in situ composites including various thermoplastics and TLCPs are formed according to the dual extrusion process disclosed in U.S. Pat. No. 5,225,488. This process allows a thermoplastic material and a TLCP material to be plasticated at different temperatures. In addition, the process yields well-dispersed TLCP streams. The composites are drawn at higher draw ratios than those disclosed in U.S. Pat. No. 5,225,488 or other conventional methods to yield fibers having enhanced mechanical properties.

As shown in FIG. 1, the dual extruder apparatus 10 disclosed in U.S. Pat. No. 5,225,488 includes TLCP extruder 12, gear pump 14, matrix extruder 30, distribution nozzle 40, 3 static mixer 42, preferably a Kenics static mixer including three Kenics mixing elements and four Koch mixing elements, capillary die 48, drawing chimney 50, water bath 52 and fiber winding equipment 54. Capillary die 48 preferably has a diameter of about 1.83 mm. Alternatively, capillary die 48 may be a spinneret (a multihole capillary) having a plurality of holes.

Figure 2:
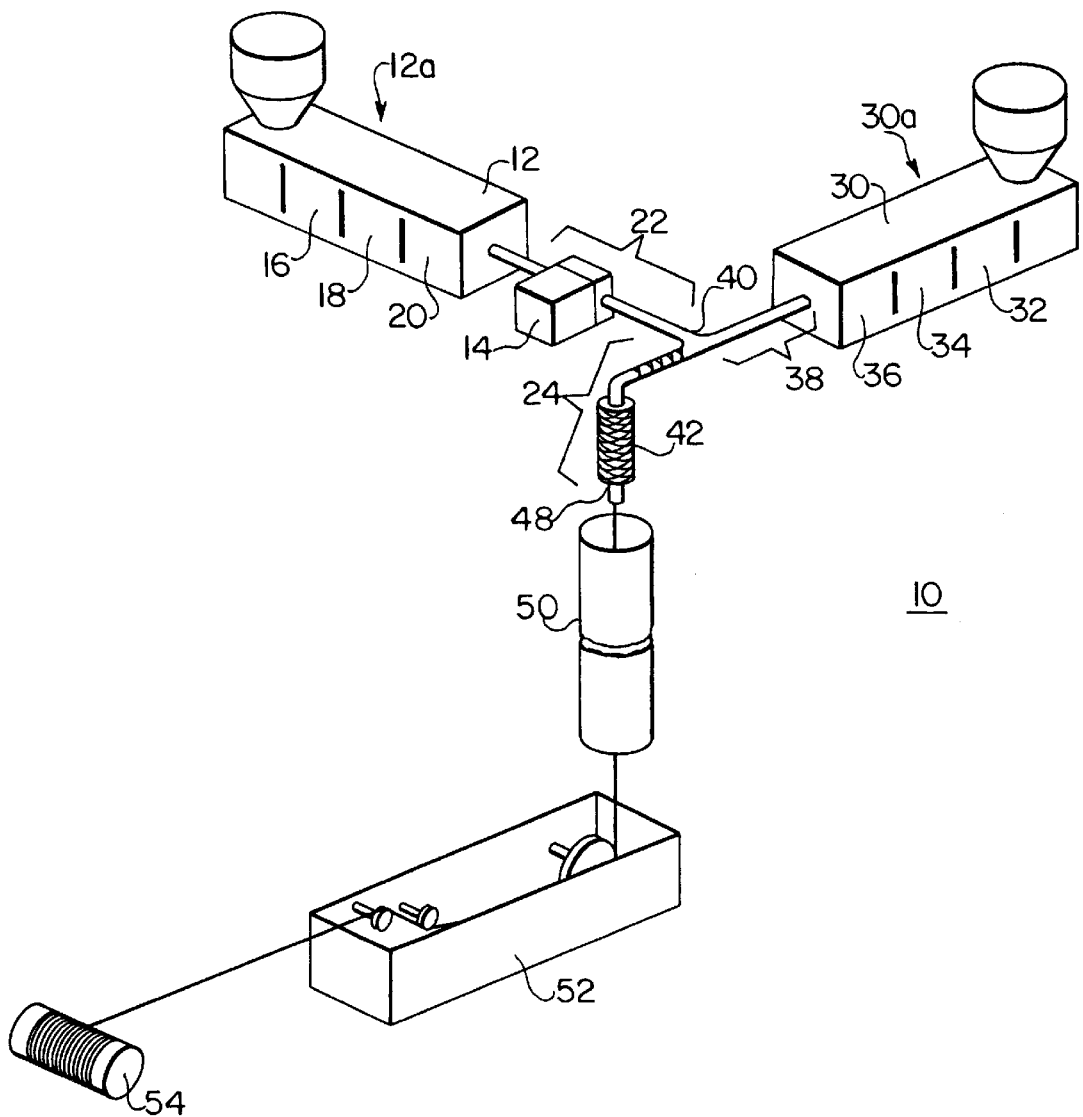
FIG. 2 illustrates the temperature control zones of the dual extrusion process.

As shown in FIG. 2, both TLCP extruder 12 and matrix extruder 30 are provided with four different temperature processing zones along their length. TLCP extruder 12 has first, second, third and fourth temperature zones 16, 18, 20 and 22, respectively, provided along its length from first end 12a of TLCP extruder 12 to distribution nozzle 40. As discussed below, each temperature zone 16, 18, 20, 22 can be heated to a processing temperature T1, T2, T3 and T4, respectively, to process the TLCP. Similarly, matrix extruder 30 includes first, second, third and fourth temperature zones 32, 34, 36 and 38, respectively, along its length from first end 30a of matrix extruder 30 to distribution nozzle 40 to process the matrix polymer. In addition, a blend exit temperature zone 24 is provided at a region including static mixer 42 and capillary die 48. This is the zone at which the blend exit temperature (B1) is provided.

According to the dual extrusion method, TLCP and a matrix polymer that may or may not have overlapping thermal processing temperatures are separately melted and extruded in TLCP extruder 12 and matrix extruder 30, respectively. The TLCP and matrix polymer melt streams are subsequently combined in static mixer 42 that distributes the streams so that long, continuous fibrils are formed in situ in the matrix polymer. The blend then passes through capillary die 48 to form desired articles, such as rods, strands, films, sheets, pipes or the like. When the blend is drawn as it exits the capillary die 48, the TLCP which is distributed throughout the matrix in the form of continuous streams imparts molecular orientation thereto. The drawn TLCP fibrils reinforce the matrix polymer and provide strength and stiffness thereto.

As discussed above, several different temperature zones 16, 18, 20, 24, 32, 34, 36, and 38 are employed so that the temperature profiles of the TLCP and matrix polymer materials can be carefully controlled so that the temperature of the matrix material does not exceed or approach its degradation temperature. Preferably, the matrix material is cooled in temperature zone 38 to a temperature equal or somewhat lower than its nominal melting temperature, or flow temperature in the case of an amorphous polymer, just before the TLCP is introduced. Cooling the matrix polymer increases both the viscosity and melt strength of the matrix polymer. The improved melt strength allows higher draw ratios to be achieved. Also, it is possible to ensure that the melt blend temperature B1 does not exceed the upper processing temperature limit of the matrix polymer by cooling the matrix polymer prior to combining it with the TLCP.

According to the inventive process, in situ composites are drawn at relatively high draw ratios. Preferably, the composites are drawn at a draw ratio in the range of about 40 to 120. The most preferred draw ratio range is about 50 to 100.

The TLCP composition of the composites is in the range from greater than 0 to about 75 weight percent. The preferred TLCP composition is in the range from greater than 0 to about 65 weight percent. The resulting composites exhibit enhanced mechanical properties. Specifically, the in situ composites have moduli and strengths that exceed predicted values under the rule of mixtures. These resulting improved in situ composites can be used in woven preforms to yield products with improved strength and stiffness values, as described in detail in the following examples.

EXAMPLE 1

A. Preparing VECTRA B950/Polypropylene In Situ Reinforced Fibers

The TLCP used in this example is VECTRA B950 (VB), a copoly(esteramide) with a glass transition temperature of 110° C., a melt temperature of 280° C. and a solid density of 1.41 g/cc. VB is a liquid crystal polyesteramide composed of 58 mole % HNA, 21 mole % terephthalic acid (TPA) and 21 mole % 4'-hydroxy acetanilide, marketed by the Celanese Corporation. The polypropylene (PP) is commercially known as Profax-6823, marketed by the Himont Company. PP has a melt temperature of 161° C. and a solid density of 0.902 g/cc. An in situ composite was formed using the dual extrusion apparatus and process disclosed in U.S. Pat. No. 5,225,488 as follows:

(1) VB and PP were separately plasticated in two 25.4 mm diameter Killion model KL100 single screw extruders;
(2) VB was distributed into the PP stream;
(3) VB and PP were mixed in a static mixer unit having three Kenics and four Koch static mixing elements;
(4) The VB/PP mixture exited the dual extruder through a 1.83 mm diameter die having a length to diameter ratio of 1.0; and
(5) The resulting VB/PP fiber extrudate was then drawn in a chimney used for controlled cooling, quenched in a water trough and spun onto a spool using a variable speed take-up device. Ambient air temperature of 27° C. was used in all examples.

Any desired blend composition can be achieved by controlling the mass flow rate of each stream by changing the screw RPM's and in the case of the VB stream changing the gear pump speed. Preferably, calibrated HD-556 Zenith gear pumps are used for each stream.

As disclosed in U.S. Pat. No. 5,225,488, illustrated in FIG. 2 and discussed above, four different temperature zones are provided along the length of both the TLCP extruder and the matrix extruder. The processing conditions for the TLCP extruder and the matrix extruder for this example are set forth in Table 4.

TABLE 4

Processing Conditions for Example 1 PP/VB

| Process Step | Schematic Designation | Temperature Setting (°C.) |
|---|---|---|
| TLCP Extruder | (1) T1 | (1) 230 |
|  | (2) T2 | (2) 320 |
|  | (3) T3 | (3) 330 |
|  | (4) T4 | (4) 320 |
| Matrix Extruder | (1) M1 | (1) 110 |
|  | (2) M2 | (2) 260 |
|  | (3) M3 | (3) 275 |
|  | (4) M4 | (4) 280 |
| Blend Exit Temperature | B1 | 290 |

In addition, the blend mass flow rate exiting capillary die 48 was 20 g/min; the TLCP extruder RPM was 5.2; the TLCP extruder gear pump RPM was 4.7; the TLCP melt pressure was 2450 psi; the matrix extruder RPM was 4.7; and the matrix melt pressure was 1220 psi.

The rule of mixtures predicts a tensile modulus of about 30 GPa for VBIPP fibers of 50/50 weight percent at draw ratios from 0 to 120. However, the 50 weight percent VB/PP fibers prepared according to this example exhibited a tensile modulus greater than 30 GPa at fiber draw ratios above 40, as set forth in Table 5. According to the rule of mixtures, a VB tensile modulus close to the extrapolated maximum tensile modulus for VB or 110 GPa would be required to achieve a fiber modulus value in the high draw ratio range. The fibrils reinforce the matrix polymer and provide strength and stiffness thereto. The in situ fibers have moduli higher than expected based on the rule of mixtures and neat VB fibers.

TABLE 5

Tensile Properties of PP/VB (50/50 Weight Percent) Fibers

| Fiber Draw Ratio | Tensile Modulus (GPa) | Tensile Strength (MPa) |
|---|---|---|
| 25.24 | 25.803 (1.316) | 299.69 (24.93) |
| 29.13 | 25.395 (2.353) | 283.77 (21.19) |
| 37.55 | 29.731 (1.647) | 330.75 (18.54) |
| 47.02 | 33.010 (1.516) | 338.23 (36.44) |
| 54.53 | 37.483 (4.352) | 363.18 (44.76) |
| 64.72 | 37.453 (0.887) | 380.66 (27.51) |
| 85.21 | 36.562 (1.992) | 370.95 (34.19) |
| 106.40 | 42.288 (1.133) | 481.84 (36.53) |

Reported properties are averaged over at least five measurements and values in parenthesis represent standard deviations to the mean.

The tensile properties of pure components are as follows: tensile modulus of PP is 1 GPa; tensile strength of PP is 30 MPa; tensile modulus of VB is 75 GPa; and tensile strength of VB is 500 MPa. The predicted tensile modulus of a PP/VB (50/50 weight percent) fiber based on the rule of mixtures is 29.86 GPa, and the predicted tensile strength based on the rule of mixtures is 213.3 MPa. Fiber properties were measured according to ASTM test number D 3376-75. Tensile strength predicted by the rule of mixtures is calculated based on the strength of VECTRA B measured under similar conditions as those used for the composites.

B. Fabric Weaving and Impregnation

The VB/PP in situ fibers formed according to section A., above, were then woven to form fabric prepregs using a manual loom and a plain weave pattern. Four layers of the resulting VB/PP fabric were placed between PP sheets and compression molded at 200° C. and 3500 kPa using a model 2696 Carver Laboratory Press with heated plates. The polypropylene sheets were generated by extruding PP through a 20.3 cm wide coat hanger die using a 25.4 mm diameter Killion single screw extruder (model KL-100).

The mechanical properties of the compression molded VB/PP composites are set forth in Table 6, below. The tensile and flexural properties (i.e., modulus and strength) of the composite samples increased with increasing VECTRA B content where the VB content is controlled by the number of the PP sheets used. Furthermore, there is nearly a sixfold increase in tensile modulus and a twofold increase in tensile strength relative to neat (i.e., zero percent VB) PP when 28.06 weight percent (about 20 volume percent) of VB is present.

TABLE 6

Mechanical Properties of VB/PP Fabric Composites

| Composite VB Weight Percent (%) | Tensile Modulus (GPa) | Tensile Strength (MPa) | Flexural Modulus (GPa) | Flexural Strength (MPa) |
|---|---|---|---|---|
| 0 (neat PP) | 1.014 (0.028) | 24.223 (0.360) | 1.283 (0.036) | 27.86 (0.71) |
| 10.21 | 3.293 (0.256) | 35.456 (2.387) | 3.023 (0.299) | 37.748 (1.188) |
| 18.46 | 3.961 (0.644) | 40.041 (2.173) | 3.762 (0.350) | 39.590 (2.376) |
| 28.06 | 6.355 (0.381) | 49.704 (1.788) | 6.770 (0.344) | 43.598 (1.173) |

Initial fabric VB content = 47.90 wt %. Fabric comprised of 0.267 mm diameter fibers (draw ratio = 47.02). Composites contained four fabric layers oriented 90 degrees to each other. Values in parentheses represent one standard deviation.

EXAMPLE 2

The processing conditions for Example 2 were identical to those for Example 1, with the following modifications: the composition of PP/VB fibers was 80/20 weight percent; the TLCP extruder RPM was 2.1; the TLCP gear pump RPM was 1.8; the TLCP melt pressure was 2100 psi; the matrix extruder RPM was 8.8; and the matrix melt pressure was 1750 psi. The tensile modulus properties for the resulting PP/VB (80/20 wt %) in situ fibers are set forth in Table 7.

TABLE 7

Tensile Properties of Uniaxially Compression Molded PP/VB (80/20 Weight Percent) Fibers

| Fiber Draw Ratio | Tensile Modulus (GPa) | Tensile Strength (MPa) |
|---|---|---|
| 5.19 | 6.34 (0.99) | 65.9 (11.5) |
| 8.92 | 5.68 (1.46) | 68.1 (8.3) |
| 11.2 | 8.65 (1.10) | 95.3 (5.6) |
| 17.8 | 9.29 (0.86) | 96.5 (7.0) |
| 23.8 | 9.40 (0.40) | 84.9 (3.7) |
| 25.0 | 10.2 (0.8) | 101 (6.7) |
| 25.4 | 10.8 (1.5) | 82.8 (5.8) |
| 30.0 | 11.5 (2.4) | 98.3 (6.7) |
| 34.3 | 12.4 (1.6) | 118 (6) |
| 41.6 | 11.8 (1.7) | 108 (15) |
| 44.4 | 13.7 (2.1) | 122 (19) |
| 63.4 | 13.4 (0.8) | 130 (20) |
| 99.7 | 13.4 (1.9) | 129 (17) |

Note: Example 2 represents data for plaques prepared from compression molding of fibers arranged uniaxially in a picture frame mold. Example 2 does not include fiber properties. The properties, however, reflect very closely the fiber properties.

The tensile properties of pure components are as follows: tensile modulus of PP is 1 GPa; tensile strength of PP is 30 MPa; tensile modulus of VB is 75 GPa; and tensile strength of VB is 500 MPa. The predicted tensile modulus of a PP/VB (80/20 weight percent) fiber based on the rule of mixtures is 11.36 GPa, and the predicted tensile strength based on the rule of mixtures is 95.98 MPa. Fiber properties were measured according to ASTM test number D 638-87b (tensile bars cut from molded fibers). Thus, the strength for 20/80 weight percent fibers exceeds the rule of mixtures value using the strength of VB measured under similar spinning conditions.

EXAMPLE 3

In this example, the TLCP is VECTRA B and the thermoplastic is polyethylene terephthalate PET. An in situ composite was formed using the dual extrusion process set forth in Example 1 with a blend mass flow rate of 12–34 g/minute and the following processing temperatures: T1=220° C.; T2=325° C.; T3=315° C.; T4=310° C.; M1=250° C.; M2=275° C.; M3=275° C.; M4=285° C.; and B1=295° C. The VB extruder RPM was 6.4, the VB gear pump RPM was 4.4, the VB extruder pressure was 1700 psi, the PET extruder RPM was 5.2 and the PET extruder pressure was 380 psi. The mechanical properties of the resulting in situ PET/VECTRA B fibers are set forth in Table 8.

TABLE 8

Mechanical Properties of PET/VECTRA B

| Composition (PET/VB weight percent/weight percent) | Tensile Modulus (GPa) | Rule of Mixtures Tensile Modulus (GPa) | Tensile Strength (MPa) | Draw Ratio |
|---|---|---|---|---|
| 75/25 | 31.42 (0.85) | 20.25/29.00 | 262.68 (74.53) | 55 |

TABLE 8-continued

Mechanical Properties of PET/VECTRA B

| Composition (PET/VB weight percent/weight percent) | Tensile Modulus (GPa) | Rule of Mixtures Tensile Modulus (GPa) | Tensile Strength (MPa) | Draw Ratio |
|---|---|---|---|---|
| 75/25 | 38.42 (1.05) | 20.25/29.00 | 430.79 (28.98) | 105.6 |
| 50/50 | 38.43 (5.54) | 38.50/56.00 | 375.93 (90.40) | 92.6 |
| 35/65 | 59.89 (4.19) | 49.50/72.20 | 779.35 (98.71) | 83.6 |

Standard deviations are given in parenthesis. Rule of mixtures values were calculated taking VECTRA B values of 75 (reported in literature for neat VB) and 110 GPa (extrapolated maximum), respectively, and a PET modulus of 2.0 GPa.

The tensile modulus exceeds that predicted by the rule of mixtures for 75/25 PET/VECTRA B compositions at draw ratios of 55 and 105.6, and for 35/65 PET/VECTRA B compositions at a draw ratio of 83.6. Furthermore, it is observed that the strength of the 35/65 composition is much higher than that of neat VB fibers, which is 500 MPa.

EXAMPLE 4

In this example, the TLCP is VECTRA B and the thermoplastic is poly(phenylene sulphide) (PPS). An in situ composite was formed using the dual extrusion process set forth in Example 1 with a blend mass flow rate of 15–20 g/minute and the following processing temperatures: T1=220° C.; T2=325° C.; T3=315° C.; T4=310° C.; M1=300° C.; M2=325° C.; M3=325° C.; M4=310° C.; and B1=295°–300° C. The VB extruder RPM was 4.1, the VB gear pump RPM was 3.6, the VB extruder pressure was 2000 psi, the PPS extruder RPM was 3.1 and the PPS extruder pressure was 320 psi. The mechanical properties of the resulting in situ PPS/VECTRA B fibers are set forth in Table 9.

TABLE 9

Mechanical Properties of PPS/VECTRA B

| Composition (weight percent/weight percent) | Tensile Modulus (GPa) | Rule of Mixtures Tensile Modulus (GPa) | Tensile Strength (MPa) | Draw Ratio |
|---|---|---|---|---|
| 50/50 | 37.41 (1.84) | 38.50/56.00 | 410.41 (74.04) | 16 |
| 50/50 | 34.35 (2.11) | 38.50/56.00 | 328.54 (39.39) | 26.5 |
| 50/50 | 44.20 (4.00) | 38.50/56.00 | 402.70 (171.17) | 69.1 |
| 50/50 | 31.51 (3.66) | 38.50/56.00 | 371.17 (55.88) | 75.8 |
| 50/50 | 40.81 (3.70) | 38.50/56.00 | 501.48 (64.26) | 113 |
| 50/50 | 55.83 (3.36) | 38.50/56.00 | 529.89 (135.11) | 130.6 |

Standard deviations are given in parenthesis. Rule of mixtures values were calculated taking VECTRA B values of 75 and 110 GPa, respectively, and a PPS modulus of 2.0 GPa.

The tensile modulus exceeds that predicted by the rule of mixtures at draw ratios of 69.1, 113 and 130.6, and the strength exceeds the value of 500 MPa measured for neat VB. It is observed that the modulus of the fibers approaches the value predicted by the rule of mixtures using the extrapolated maximum value of 110 GPa for VB.

EXAMPLE 5

HX1000 is a copolyester composed of p-hydroxybenzoic acid (HBA), hydroquinone (HQ), substituted HQ and terephthalic acid (TA) marketed by the DuPont Company. HX1000 is a nearly amorphous TLCP with $T_g$ (glass transition temperature) of 180° C. and no well-defined melting temperature, but with a melt processing temperature of 310° to 350° C. PET/HX1000 blends (50/50 weight percent) were extruded according to the dual extrusion process set forth in Example 1 with a blend mass flow rate of 20–45 g/minute, draw ratios up to 55–60 and the following processing temperatures: T1=275° C.; T2=325°–335° C.; T3=325°–35° C.; T4=310°–320° C.; M1=235°–250° C.; M2=270°–280° C.; M3=270°–280° C.; M4=280°–295° C.; and B1=285°–305° C. HX1000 extruder RPM was 9.1, HX1000 gear pump RPM was 10.0, HX1000 extruder pressure was 2000 psi, PET extruder RPM was 5.6 and PET extruder pressure was 1100 psi. The machine direction properties of the neat polymers taken from injection molded plaques are set forth in Table 10 and the tensile strength properties for various draw ratios are set forth in Table 11.

TABLE 10

Neat Polymer Properties for PET and HX1000 (Injection Molded Samples)

| Polymer | Young's Modulus (GPa) | Tensile Strength (MPa) |
| --- | --- | --- |
| HX1000 | 15.55 (1.337) | 134.7 (12.84) |
| PT X267 (PET) | 2.176 (0.067) | 47.87 (2.063) |

The maximum Young's Modulus of spun HX1000 is 53 GPa.

TABLE 11

Tensile Properties of PET/HX1000 (50/50 Weight Percent) Fibers

| Draw Ratio | Tensile Modulus (GPa) | Tensile Strength (MPa) |
| --- | --- | --- |
| 12.19 | 19.96 (3.18) | 150.73 (44.1) |
| 34.46 | 20.68 (5.23) | 150.08 (43.1) |
| 40.67 | 25.31 (17.01) | 130.97 (43.4) |
| 52.90 | 36.43 (5.54) | 181.12 (80.17) |

The tensile strength of the in situ PET/HX1000 (50/50 wt %) exceeded that for the neat fibers at draw ratios ranging from about 12.19 to about 52.90. The tensile properties of pure HX1000 are as follows: tensile modulus of HX1000 is 53 GPa and tensile strength of HX1000 is 340 MPa. The predicted tensile modulus of a PET/HX1000 (50/50 weight percent) fiber based on the rule of mixtures is 26.58 GPa, and the predicted tensile strength based on the rule of mixtures is 188.16 MPa. Thus, the modulus for 50/50 weight percent fibers exceeds the rule of mixtures value using the modulus of HX1000 measured under similar spinning conditions at a draw ratio in the range between about 12.19 and 40.67.

EXAMPLE 6

NYLON-11 [poly(undecanoamide)] has a $T_g$ (glass transition temperature) of 46° C. HX8000 is a copolyester composed of p-hydroxybenzoic acid (BBA), hydroquinone (HQ), substituted HQ and terephthalic acid (TA) marketed by the DuPont Company. Fibers of NYLON-11 with 10 weight percent HX8000 were extruded according to the dual extrusion process set forth in Example 1 using the following processing temperatures for NYLON-11: T1 =215° C.; T2=236° C.; T3=247° C. and T4=250° C. The extrusion temperatures for HX8000 were as follows: T1=205° C.; T2=256° C.; T3=272° C. and T4=275° C. The blend exit temperature was 275° C., the HX8000 extruder RPM was 1.1, the HX8000 gear pump RPM was 1.0, the HX8000 extruder pressure was 750 psi, the NYLON-11 extruder RPM was 10.6 and the NYLON-11 extruder pressure was 1100 psi. The resulting tensile properties are set forth in Table 12.

TABLE 12

Tensile Properties of NYLON-11/HX8000 (90/10 Weight Percent) Fibers

| Fiber Draw Ratio | Tensile Modulus (GPa) | Tensile Strength (MPa) |
| --- | --- | --- |
| 19.7 | 5.593 (0.27) | 86.09 (2.88) |
| 49.8 | 7.34 (0.31) | 115.508 (1.53) |
| 69.3 | 7.745 (0.05) | 106.028 (14.25) |
| 110.2 | 8.542 (0.91) | 118.958 (26.32) |

Reported properties are averaged over at least five measurements and values in parenthesis represent standard deviations to the mean.

The tensile properties of pure components are as follows: tensile modulus of NYLON-11 is 2.5 GPa; tensile strength of NYLON-11 is 40 MPa; tensile modulus of HX8000 is 50 GPa; and tensile strength of HX8000 is 510 MPa. The predicted tensile modulus of a NYLON-11/HX8000 (90/10 weight percent) fiber based on the rule of mixtures is 6.11 GPa, and the predicted tensile strength based on the rule of mixtures is 75.72 MPa. Thus, the strength and modulus for NYLON-11 /HX8000 (90/10 weight percent) fibers exceed the rule of mixtures values.

EXAMPLE 7

Fibers of NYLON-11 with 20 weight percent HX8000 were extruded according to the dual extrusion process set forth in Example 1 using the following processing temperatures for NYLON-11: T1=215° C.; T2=236° C.; T3=247° C. and T4=250° C. The extrusion temperatures for HX8000 were as follows: T1=205° C.; T2=256° C.; T3=272° C. and T4=275° C. The blend exit temperature was 284° C., the HX8000 extruder RPM was 1.5, the HX8000 gear pump RPM was 1.5, the HX8000 extruder pressure was 800 psi, the NYLON-11 extruder RPM was 8.1 and the NYLON-11 extruder pressure was 980 psi. The resulting tensile properties are set forth in Table 13.

TABLE 13

Tensile Properties of NYLON-11/HX8000 (80/20 Weight Percent) Fibers

| Fiber Draw Ratio | Tensile Modulus (GPa) | Tensile Strength (MPa) |
| --- | --- | --- |
| 24.2 | 9.755 (0.52) | 106.98 (13.86) |
| 51.8 | 12.83 (1.25) | 131.46 (26.46) |
| 95.4 | 14.55 (0.53) | 190.08 (8.18) |
| 148.2 | 13.95 (1.31) | 154.86 (15.9) |

Reported properties are averaged over at least five measurements and values in parenthesis represent standard deviations to the mean.

The tensile properties of pure components are as follows: tensile modulus of NYLON-11 is 2.5 GPa; tensile strength of NYLON-11 is 40 MPa; tensile modulus of HX8000 is 50 GPa; and tensile strength of HX8000 is 510 MPa. The predicted tensile modulus of a NYLON-11/HX8000 (80/20 weight percent) fiber based on the rule of mixtures is 9.86 GPa, and the predicted tensile strength based on the rule of mixtures is 112.85 MPa. Thus, the strength and modulus values for NYLON-11/HX8000 (80/20 weight percent) fibers exceed the rule of mixtures values.

Modifications and variations of the above-described embodiments of the present invention are possible, as appreciated by those skilled in the art in light of the above teachings. It is, therefore, to be understood that, within the scope of the appended claims and their equivalents, the invention may be practiced otherwise than as specifically described.

What is claimed is:

1. A thermoplastic composition reinforced with a liquid crystal polymer, wherein said composition comprises a thermoplastic fiber formed of a matrix polymer reinforced with thermotropic liquid crystal polymer fibrils; said fiber having a tensile modulus greater than that predicted by the rule of mixtures and wherein said fiber has been produced at a draw ratio in the range of about 40 to 120.

2. The composition of claim 1, wherein said fiber has a draw ratio in the range of about 50 to 100.

3. The composition of claim 1, wherein the concentration of said thermotropic liquid crystal polymer fibrils is in the range of greater than 0 and less than 75 weight percent thermotropic liquid crystal polymer fibrils.

4. The composition of claim 1, wherein the concentration of said thermotropic liquid crystal polymer fibrils is in the range of greater than 0 and less than 65 weight percent thermotropic liquid crystal polymer fibrils.

5. The composition of claim 1, wherein said therein thermoplastic fiber comprises a polypropylene matrix.

6. The composition of claim 5, wherein said thermotropic liquid crystal polymer fibrils comprise a liquid crystal polyesteramide having a concentration in the range of about 20 to 50 weight percent.

7. The composition fiber of claim 6, wherein said liquid crystal polyesteramide comprises 2-hydroxy-6-napthoic acid, terephthalic acid and 4'-hydroxy acetanilide.

8. The composition fiber of claim 6, wherein said thermoplastic fiber exhibits a tensile modulus of about 40–45 GPa at a draw ratio in the range of about 100–110.

9. The composition of claim 6, wherein said composition exhibits a tensile modulus of about 12 to 14 GPa at a draw ratio in the range of about 34 to 100.

10. The composition of claim 6, wherein said thermoplastic fiber exhibits a tensile strength of about 400 to 500 MPa.

11. The composition fiber of claim 6, wherein said composition exhibits a tensile strength of about 118 to 129 MPa at a draw ratio in the range of about 34 to 100.

12. The composition of claim 1, wherein said thermoplastic fiber comprises a polyethylene terephthalate matrix.

13. The composition of claim 12, wherein said thermotropic liquid crystal polymer fibrils comprise a liquid crystal polyesteramide having a concentration in the range of about 25 to 65 weight percent.

14. The composition of claim 13, wherein said liquid crystal polyesteramide is comprised of 2-hydroxy-6-napthoic acid, terephthalic acid and 4'-hydroxy acetanilide.

15. The composition of claim 13, wherein said thermoplastic fiber exhibits a tensile modulus in the range of about 31–38 GPa at a draw ratio in the range of about 55–106.

16. The composition of claim 13, wherein said thermoplastic fiber exhibits a tensile modulus of about 60 GPa at a draw ratio of about 84.

17. The composition of claim 13, wherein said thermoplastic fiber exhibits a tensile strength of about 260 to 431 MPa.

18. The composition of claim 13, wherein said thermoplastic fiber exhibits a tensile strength of about 780 MPa at a draw ratio of about 84.

19. The composition of claim 12, wherein said thermotropic liquid crystal polymer fibrils comprise a copolyester having a concentration of about 50 weight percent.

20. The composition of claim 19, wherein said copolyester is comprised of hydroquinone, p-hydroxybenzoic acid, substituted hydroquinte and terephthalic acid.

21. The composition of claim 19, wherein said thermoplastic fiber exhibits a tensile modulus of about 180 GPa at a draw ratio of about 53.

22. The composition of claim 12, wherein said thermoplastic fiber exhibits a tensile strength of about 180 MPa.

23. The composition of claim 1, wherein said thermoplastic fiber comprises a poly(phenylene sulphide) matrix.

24. The thermoplastic fiber of claim 23, wherein said thermotropic liquid crystal polymer fibrils comprise a liquid crystal polyesteramide having a concentration of about 50 weight percent.

25. The thermoplastic fiber of claim 24, wherein said liquid crystal polyesteramide comprises 2-hydroxy-6-napthoic acid, terephthalic acid and 4'-hydroxy acetanilide.

26. The thermoplastic fiber of claim 23, wherein said thermoplastic fiber exhibits a tensile modulus of about 56 GPa at a draw ratio of about 130.

27. The thermoplastic fiber of claim 25, wherein said thermoplastic fiber exhibits a tensile strength of about 530 MPa.

28. The composition of claim 1, wherein said thermoplastic fiber comprises a poly(undecanoamide) matrix.

29. The composition of claim 28, wherein said thermotropic liquid crystal polymer fibrils comprise a copolyester having a concentration in the range of about 10 to 20 weight percent.

30. The composition of claim 29, wherein said copolyester is comprised of hydroquinone, p-hydroxybenzoic acid, hydroquinone, substituted hydroquinone and terephthalic acid.

31. The composition of claim 28, wherein said thermoplastic fiber exhibits a tensile modulus of about 7.3 to 8.5 GPa at a draw ratio in the range of about 50 to 110.

32. The composition of claim 28, wherein said composition exhibits a tensile modulus of about 12.8 to 14.6 at a draw ratio in the range of about 52 to 148.

33. The composition of claim 28, wherein said thermoplastic fiber exhibits a tensile strength of about 86 to 119 MPa at a draw ratio in the range of about 20 to 110.

34. The composition of claim 28, wherein said composition exhibits a tensile strength of about 131 to 190 MPa at a draw ratio in the range of about 52 to 148.

35. The composition of claim thermoplastic fiber of claim 1 wherein the concentration of said liquid crystal polymer is in the range of 10 to 65 weight percent.

36. A high tensile modulus thermoplastic fiber reinforced with liquid crystal polymer fibrils, the thermoplastic fiber having a tensile modulus greater than that predicted by the rule of mixtures and prepared according to a process comprising the steps of:

producing a first melt stream of a matrix polymer;

producing a second melt stream of a liquid crystal polymer separate from said first melt stream;

combining said first melt stream with second melt stream prior to any other mixing of said first and second melt streams in geometrically different configurations to form a blend;

and drawing said blend at a draw ratio in the range of about 40 to 120 to form said high tensile modulus thermoplastic fiber reinforced with said liquid crystal polymer fibrils.

37. The thermoplastic fiber of claim 36, wherein said fiber is drawn at a draw ratio in the range of about 50 to 100.

* * * * *